Patented Aug. 17, 1948

2,447,289

UNITED STATES PATENT OFFICE 2,447,289

POLYMERIZATION OF VINYL AND VINYLIDENE CHLORIDES

Hanns Peter Staudinger, Ewell, and Maurice Dudley Cooke, Banstead, England, assignors to The Distillers Company Limited, Edinburgh, Scotland, a company of Great Britain No Drawing. Application August 2, 1944, Serial No. 547,810. In Great Britain September 6, 1943

4 Claims. (Cl. 260—88)

This invention relates to the polymerisation of vinyl chloride and/or vinylidene chloride, and mixtures thereof with other polymerisable compounds. More particularly this invention relates to polymerisation processes in which the liquid constituents of the reaction mixture are present in a single phase. A number of diluents have been proposed for use in this type of polymerisation process, and amongst others, alcohols, ethers, or the lower paraffin hydrocarbons have been employed.

However, the use of such diluents by themselves has proved disadvantageous as, owing to the tendency of the particles of formed polymer to agglomerate or coalesce, it has been necessary to use a considerable bulk of diluent, or alternatively, to check polymerisation long before it is complete.

The latter method is costly to operate, whilst the use of large amounts of diluent leads to the formation of polymers of low molecular weight having unsatisfactory mechanical and physical properties and to the reduction of the rate of polymerisation. This lowering of the rate of polymerisation and reduction in the degree of polymerisation will be hereinafter referred to as "dilution effect."

The presence of acids in the reaction mixture has hitherto been thought to lead to the production of polymers of undesirable properties for example, thermal instability of the polymer and liability to discolouration, and for this reason it has been recommended to add basic substances to the mixture either before or during polymerisation.

We have now found that polymers of vinyl chloride and/or vinylidene chloride or mixtures thereof with other polymerisable compounds, having superior properties can be obtained in satisfactory yields by the process of the present invention in accordance with which the polymerisation is carried out in a single-phase reaction mixture in the presence of a water-soluble saturated aliphatic mono-carboxylic acid, containing no hydroxy or amino substituent or substituents, hereinafter referred to for convenience as a fatty acid, and containing not more than four carbon atoms in the molecule as diluent.

We have found that these acidic diluents exert only a comparatively small "dilution effect," thus enabling the production of satisfactory polymers even from dilute solutions of the monomeric substance or substances in the acidic diluent. In some cases the rate of polymerisation is even accelerated by the use of these acidic diluents. Polymerisation may be effected under the influence of peroxidic catalysts (for example, benzoyl peroxide, ammonium persulphate or hydrogen peroxide) and/or heat and/or actinic rays.

We have found acetic and propionic acids are particularly suitable for the purpose of this invention. The mono-hydroxy-mono-carboxy acids, such as lactic acid, are not suitable as diluents. It is not necessary that anhydrous acids be employed, and we have made the surprising discovery that small amounts of water can be tolerated, and, in certain cases, for example, when peroxidic polymerisation catalysts, e. g. inorganic per-salts are employed, the presence of small amounts of water is even advantageous so long as the amount of water is not sufficient to cause separation of the liquid constituents into more than one phase at the temperature of polymerisation. We may thus carry out the polymerisation in the presence of acetic acid containing from 3 to 5% by weight of water. It is, however, possible that separation of the liquid constituents into two phases may occur at temperatures below that at which polymerisation is effected.

The beneficial effect of acidic diluents is more pronounced when polymerisation is carried out in the presence of peroxidic compounds such as, for example, organic peroxides and inorganic persalts, as catalysts, than when no such catalysts are employed. The proportion of acidic diluent present in the reaction mixture may vary within wide limits but we prefer to employ such diluents in a proportion between 1% and 60% by weight of the reaction mixture.

Small amounts of an inorganic acid, e. g. phosphoric, chlorsulfonic or hydrochloric acid may also be present during the polymerisation.

The following examples illustrate the manner in which the invention may be carried into effect.

*Example 1*

15 g. vinyl chloride, 15 g. commercial acetic acid (98.2% strength) and 0.075 g. crotonyl peroxide were heated in a sealed tube at 40° C.

for 48 hours (tube 1). Simultaneously an experiment was carried out in which 15 g. commercial methanol replaced the acetic acid (tube 2). It was observed that after 4 hours the contents of tube 1 became opaque due to polymer-formation, while in tube 2 the first signs of polymer-formation were visible only after about 10 hours. After 48 hours both tubes were cooled to −30° C., and their contents were transferred into water, so as to allow any unpolymerised vinyl chloride to evaporate. After washing several times with boiling water and thereafter drying under vacuum at 60° C., the polymers were examined:

(a) For viscosity: The flow time of a 2% by weight solution of the polymer in cyclohexanone was measured in a No. 2 U-tube viscometer (British standard specification 1937). A higher viscosity was taken to indicate a higher degree of polymerisation.

(b) For heat stability: A solution of 4 g. polymer in 20 ccs. dibutyl phthalate was heated to 180° C. for 15 minutes, after which time the solution was poured into a mould. The solution set to a gel, on cooling in the mould, leaving a slab of rigid gel of 4.5 mm. thickness. The colour of this gel was then compared in a Lovibond tintometer against standard colour slides. Higher colour numbers indicate a higher degree of discoloration i. e., a lower stability to heat.

|  | Tube 1 | Tube 2 |
|---|---|---|
| Yield | 96% | 62.5% |
| Viscosity | 335 sec | 197 sec |
| Heat stability | 5 | 22 |
| Colour | Light straw colour | Dark amber |

Example 2

10 g. vinylidene chloride, 5 g. vinyl chloride, together with 15 g. of propionic acid (94%) and 0.1 g. crotonyl peroxide were heated in a sealed tube to 45° C. for 24 hours. A soft spongy lump was obtained which could readily be broken into fine grains, weighing, after washing and drying, 13.7 g. (yield =92%). The polymer was soluble only in hot cyclohexanone, giving a viscosity, when tested as in Example 1, of 420 sec. The polymer was of excellent stability.

Example 3

In this case a cylindrical steel tube, flanged at both ends, of 2½" diameter and 18" length was used as a polymerisation vessel. The inside of the tube was coated with a vitreous enamel. To prevent contact of the contents with lead washers which were used as jointing material between the cover plates and the tube flanges, thick sheets of regenerated cellulose were placed over the open ends of the tube before assembly of the washers and cover plates thereon. In the first experiment (A) the tube was charged with 500 g. vinyl chloride, 500 ccs. of 96.5% acetic acid and 3 g. crotonyl peroxide. The polymerisation was carried out by rotating the closed tube end-over-end, immersed in a water bath maintained at 40 C. ±1° C. for 48 hours. On slowly undoing one flange, only a little gas was released, indicating that an almost complete polymerisation had occurred. The second experiment (B) was carried out under identical conditions, but for the fact that methanol was used instead of the acetic acid. In the latter case, a considerable quantity of gas (vinyl chloride) escaped on opening the flange slightly when the polymerisation reaction was stopped.

The polymers were washed with water and then washed on suction filters with large quantities of boiling water. The polymers were then tested with the following results:

|  | Polymer A | Polymer B |
|---|---|---|
| Yield | 464 gms. (92.8%) | 306 gms. (61.2%) |
| Viscosity | 308 sec | 212 sec |
| Heat Stability | 4 | 20 |
| Colour | Very light yellow | Brown |
| Tensile strength | 3450 lbs./sq. in | 2600 lbs./sq. in |
| Extension | 255% | 315% |
| Volume resistivity | $3.7 \times 10^{11}$ | $8.5 \times 10^{10}$ |

The tests for tensile strength, extension and volume resistivity were carried out on plasticised samples consisting of 65% by weight of polymer, 32% by weight of methylglycolphthalate and 3% by weight of lead stearate.

The tests for viscosity and heat stability were carried out in the manner indicated in Example 1.

What we claim is:

1. In a process of polymerising an asymmetrically substituted ethylene having at most two chlorine atoms in the molecule, in the homogeneous liquid phase in a medium comprising a diluent and a polymerisation catalyst, the step of carrying out the polymerisation in the presence of an aqueous organic diluent containing an amount of water not exceeding 6% by weight thereof, the sole organic component of said diluent being a water-soluble fatty acid having not more than four carbon atoms in the molecule.

2. The process step according to claim 1 wherein said diluent is present in an amount of between 1% and 60% by weight of said homogeneous liquid phase.

3. A process according to claim 1 wherein said fatty acid is acetic acid.

4. A process according to claim 1 wherein said fatty acid is propionic acid.

HANNS PETER STAUDINGER.
MAURICE DUDLEY COOKE.

REFERENCES CITED

The following references are of record in the file of this patent:

UNITED STATES PATENTS

| Number | Name | Date |
|---|---|---|
| 1,988,529 | Werntz | Jan. 22, 1935 |
| 2,068,424 | Mark et al. | Jan. 19, 1937 |
| 2,366,306 | Alexander et al. | June 2, 1945 |
| 2,377,752 | Britton et al. | June 5, 1945 |